United States Patent [19]
Besling et al.

[11] Patent Number: 6,081,779
[45] Date of Patent: Jun. 27, 2000

[54] LANGUAGE MODEL ADAPTATION FOR AUTOMATIC SPEECH RECOGNITION

[75] Inventors: Stefan Besling; Hans-Günter Meier, both of Aachen, Germany

[73] Assignee: U.S. Philips Corporation, New York, N.Y.

[21] Appl. No.: 09/033,551

[22] Filed: Mar. 2, 1998

[30] Foreign Application Priority Data

Feb. 28, 1997 [DE] Germany .......................... 197 08 184

[51] Int. Cl.$^7$ .................................................. G10L 15/18

[52] U.S. Cl. .......................................... 704/257; 704/240

[58] Field of Search ................................... 704/239, 240, 704/251, 256, 257

[56] References Cited

U.S. PATENT DOCUMENTS

| | | | |
|---|---|---|---|
| 4,741,036 | 4/1988 | Bahl et al. | 704/256 |
| 5,241,619 | 8/1993 | Schwartz et al. | 704/200 |
| 5,510,981 | 4/1996 | Berger et al. | 704/2 |
| 5,621,859 | 4/1997 | Schwartz et al. | 704/256 |
| 5,675,707 | 10/1997 | Gorin et al. | 704/257 |

OTHER PUBLICATIONS

IEEE Trans. on Patern Analysis and Machine Intelligence, vol. 12, Jun. 1990, pp. 570–583, (Cache Language Model).

H. Weber, "Einfuhrung in Die Wahrscheinlichkeitsrechnung und Statistik Fur Ingenieure", B.G. Teubner, Stuttgart 1992, Notably from p. 279.

S. Besling et al, "Confidence–Driven Estimator Perturbation: BMPC Best Model Perturbation Within Confidence", 1997 IEEE International Conference on Acoustics, Speech and Signal Processing (Cat. No. 97CB36052), 1997 IEEE International Conference on Acoustics, Speech and Signal Processing Munich, Germany pp. 21–24, Apr. 1997, pp. 803–806, vol .2 XP002089830, ISBN 0–8186–7919–0 1997, Los Alamitos, CA USA, IEEE Comput. Soc. Press, USA.

*Primary Examiner*—Richemond Dorvil
*Assistant Examiner*—Abul K. Azad

[57] ABSTRACT

For speech recognition, notably the recognition of curtly spoken speech with a large vocabulary, language models which take into account the probabilities of occurrence of word sequences are used so as to enhance the recognition reliability. These language models are determined from rather large quantities of text and hence represent an average value formed over several texts. However, the language model hence is not adapted very well to particularities of a special text. In order to achieve such adaptation of an existing language model to a special text while using only a small quantity of text, the invention proposes to determine confidence intervals from the counts of the word sequences occurring in the short text; this determination is possible by using calculation methods which are known from statistics. Subsequently, for each predecessor word sequence there is determined a scaling factor which adapts the language model values for all words in such a manner that as many adapted language model values as possible are situated within the confidence intervals. If scaled language model values are situated outside associated confidence intervals after the adaptation, the nearest boundaries of the confidence intervals are used as adapted language model values.

2 Claims, 1 Drawing Sheet

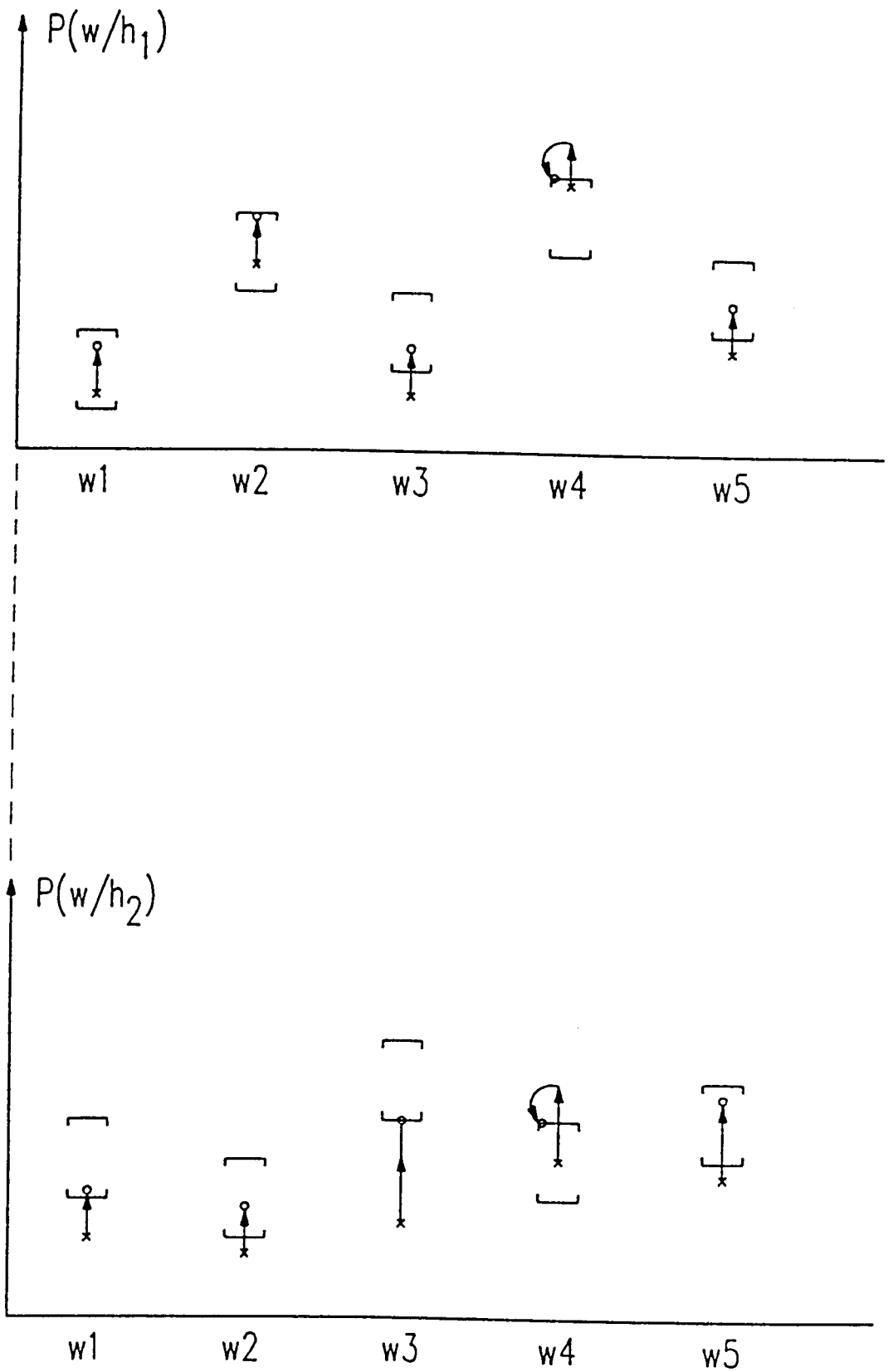

LANGUAGE MODEL ADAPTATION FOR AUTOMATIC SPEECH RECOGNITION

BACKGROUND OF THE INVENTION

The invention relates to automatic speech recognition utilizing a language model with language model values which are determined from a comparatively long training text, an adaptation of the language model being performed on the basis of notably short text segments in given cases, notably for given types of text.

For automatic speech recognition a series of test values is derived from a speech signal, said test values being compared with stored reference values, series of reference values representing words of a predetermined vocabulary. The comparison yields scores which are linked to language model values at word boundaries. These language model values represent the probabilities of given word sequences of limited length and have been determined from a large quantity of training speech signals. Consequently, long-term variations in usage, for example theme or style of speaking, cannot be taken into account by means of these language model values. Because suitably adapted language model values have a considerable effect on the reliability of the speech recognition, it is desirable to adapt the language model values as well as possible on the basis of a small quantity of current text. This adaptation can be performed during the recognition of a special text or also subsequent to the recognition of a part of the text after manual correction of recognition errors.

A method of forming an adaptive language model is disclosed in IEEE Trans. on Pattern Analysis and Machine Intelligence, Vol. 12, June 1990, pp. 570 to 583, and is known as the CACHE language model. According to this method relative frequencies $N_a(w)/N_a$ are calculated, where $N_a(w)$ represents the frequency of the word w in the adaptation material and $N_a$ stands for the overall number of words in the adaptation material. The adaptive cache language model $P_a(w|h)$ is then calculated from the basic language model $P_s(w|h)$ as:

$$P_a(w \mid h) := \lambda P_s(w \mid h) + (1-\lambda)\frac{N_a(w)}{N_a}$$

in which the interpolation parameter $\lambda$ is either fixed or determined for each adaptation in such a manner that the adaptation material is described as well as possible, as is known from Proc. ICASS, Minneapolis, USA, Vol. II, April 1993, pp. 585 to 593. The resultant adaptation of the language model values to an instantaneous text, however, still is not optimum.

SUMMARY OF THE INVENTION

It is an object of the invention to provide a method of adapting language model values which enables, even on the basis of a short speech signal, suitable adaptation of the language model values to particularities of the speech signal, for example theme or style.

DETAILED DESCRIPTION OF THE PREFERRED EMBODIMENTS

This object is achieved according to the invention in that confidence intervals for words of the vocabulary are formed, in dependence on different preceding words, from a comparatively short text whereto the speech signal is to be adapted. This operation can be performed by means of known statistics and probability calculation methods, for example as disclosed in the book by H. Weber "Einführung in die Wahrscheinlichkeitsrechnung und Statistik für Ingenieure", B. G. Teubner, Stuttgart 1992, notably from page 279. During the next step the language model values of the language model, determined on the basis of extensive training speech signals, are multiplied by a scaling factor which is selected for each different predecessor word sequence in such a manner that for this predecessor word sequence the language model values, i.e. the probabilities of occurrence of the relevant word after this predecessor word sequence, fit into the confidence intervals as well as possible. For each scaled language model value which thus lies outside the associated confidence interval the nearest boundary of the confidence interval is used. For combinations of words with given predecessor word sequences which have not occurred there can be calculated a confidence interval in as far as the predecessor word sequence has occurred. However, if the predecessor word sequence has not occurred either in combination with any word of the vocabulary, no confidence intervals can be determined and the original language model values are used without adaptation. Because predecessor word sequences having a length of only one word or two words are used for many practical applications, the language model values can already be adapted on the basis of a small quantity of spoken text data.

The scaling factor must be chosen so that the sum of the probability values, i.e. the language model values of all words of a given predecessor word sequence, amounts to the value 1. However, because the language model values which are not adapted according to the scaling factor but are set to the nearest boundary of the associated confidence interval are also taken into account for this condition, the scaling factor is determined by means of arithmetic methods which are known for such cases.

The determination of the adapted language model values $P_a(w|h)$ for a special text from the basic language model values $P(w|h)$, determined on the basis of extensive training material, is performed as follows:

$$P_a(w \mid h) = \begin{cases} \alpha_h(w) & w \in A_h \\ \beta_h(w) & w \in B_h \\ \gamma_h P(w \mid h) & \text{else} \end{cases}$$

where $A_h$ is the probability range below the lower boundary $\alpha_h$ and $B_h$ is the probability range beyond the upper boundary $\beta_h$ and $\gamma_h$ is the scaling factor derived from the actual text according to known optimizing methods.

The principle of this adaptation will be explained in more detail with reference to the FIGURE. For a number of words w1 . . . w5, the FIGURE shows the probabilities that these words occur after the predecessor word sequence $h_1$ or $h_2$. The crosses denote the original probability values, or language model values, determined from the trainings text, that the word w1 . . . w5 follows the predecessor word sequence $h_1$ or $h_2$, and the sections bounded by vertical strokes indicate the corresponding confidence interval determined from the present text. The arrows indicate the shift of the original language model values due to the scaling factor $\gamma_h$, the small circles indicating the adapted language model values. In the upper graph for the predecessor word sequence $h_1$ it can be seen that for the word w1 the original language model value was already within the confidence interval and remains therein despite the scaling. This also holds for the word w2. For the words w3 and w5 the original language model value was situated outside the confidence interval and is shifted into the interval by the scaling. For the word w4 the original language model value is situated within the confidence interval, but is shifted out of the interval by the scaling, so that now the upper boundary of the confidence interval is used for the word w4 as denoted by the small circle.

In the lower graph for the predecessor word sequence $h_2$ it is assumed that the original language model values for the words w1, w2 and w5 are moved into the confidence interval by the scaling operation, whereas for the word w4 the scaled language model value is situated outside the confidence interval again and hence is set to the upper boundary of the interval. For the word w3 the original language model value, however, is situated far below the confidence interval and it is not moved into the interval by scaling, so that in this case the lower boundary of the associated confidence interval is used as the adapted language model value.

Using the language model values adapted in this manner, a significant improvement of the recognition results can be achieved, particularly when the nature of the text to be recognized deviates significantly from the original training material, notably in respect of style or theme.

What is claimed is:

1. A method of adapting a language model with language model values for automatic speech recognition, in which test values are derived from a speech signal and compared with reference values determining a given vocabulary, there being derived scores which are linked to language model values at word boundaries, the language model values being dependent on the probability of occurrence of a given word of the vocabulary in dependence on at least one predecessor word, said method including the following steps:

determination of a basic language model with basic language model values on the basis of training speech signals, determination, utilizing statistic calculation methods, of confidence intervals, having an upper and a lower boundary for language model values, on the basis of a different speech signal which deviates from the training speech signals, determination of a scaling factor in such a manner that the basic language model values scaled thereby satisfy an optimization criterion which the position of the scaled language model values are within the confidence intervals, use of scaled language model values which are situated in the confidence intervals and, in the case of scaled language model values situated beyond the boundaries of the confidence intervals, the nearest boundary as adapted language model values and, for confidence intervals not determined from the different speech signal, the basic language model values for the further recognition of the different speech signal.

2. A method as claimed in claim 1, in which the confidence intervals for the probability of occurance of a word after predetermined sequence of predecessor words are determined from the number of occurrences of the predetermined sequence in the different speech signal.

* * * * *